(12) United States Patent
Blum

(10) Patent No.: US 11,576,380 B2
(45) Date of Patent: Feb. 14, 2023

(54) FUNGICIDAL COMPOSITIONS

(71) Applicant: Syngenta Participations AG, Basel (CH)

(72) Inventor: Mathias Blum, Stein (CH)

(73) Assignee: Syngenta Participations AG, Basel (CH)

( * ) Notice: Subject to any disclaimer, the term of this patent is extended or adjusted under 35 U.S.C. 154(b) by 246 days.

(21) Appl. No.: 16/765,678

(22) PCT Filed: Nov. 13, 2018

(86) PCT No.: PCT/EP2018/081112
§ 371 (c)(1),
(2) Date: May 20, 2020

(87) PCT Pub. No.: WO2019/101580
PCT Pub. Date: May 31, 2019

(65) Prior Publication Data
US 2020/0296962 A1    Sep. 24, 2020

(30) Foreign Application Priority Data

Nov. 21, 2017   (EP) ..................................... 17202875

(51) Int. Cl.
| | | |
|---|---|---|
| *A01N 43/40* | (2006.01) |
| *A01N 43/56* | (2006.01) |
| *A01N 37/44* | (2006.01) |
| *A01N 43/54* | (2006.01) |
| *A01N 63/22* | (2020.01) |
| *A01N 63/34* | (2020.01) |
| *A01N 37/34* | (2006.01) |

(52) U.S. Cl.
CPC ............. *A01N 43/40* (2013.01); *A01N 37/34* (2013.01); *A01N 37/44* (2013.01); *A01N 43/54* (2013.01); *A01N 43/56* (2013.01); *A01N 63/22* (2020.01); *A01N 63/34* (2020.01)

(58) Field of Classification Search
None
See application file for complete search history.

(56) References Cited

U.S. PATENT DOCUMENTS

2011/0082160 A1    4/2011   Owen et al.

FOREIGN PATENT DOCUMENTS

| | | |
|---|---|---|
| WO | 2016109257 A1 | 7/2016 |
| WO | 2016122802 A1 | 8/2016 |
| WO | 2018204435 A1 | 11/2018 |
| WO | 2018204436 A1 | 11/2018 |
| WO | 2018204437 A1 | 11/2018 |
| WO | 2019042800 A1 | 3/2019 |

OTHER PUBLICATIONS

International Search Report and Written Opinion for International Patent Application No. PCT/EP2018/081112, dated Jan. 31, 2019.

*Primary Examiner* — Bethany P Barham
*Assistant Examiner* — Barbara S Frazier
(74) *Attorney, Agent, or Firm* — BakerHostetler; Toni-Junell Herbert

(57) ABSTRACT

A fungicidal composition comprising a mixture of components (A) and (B), wherein components (A) and (B) are as defined in claim 1, and use of the compositions in agriculture or horticulture for controlling or preventing infestation of plants by phytopathogenic microorganisms, preferably fungi.

14 Claims, No Drawings

FUNGICIDAL COMPOSITIONS

CROSS-REFERENCE TO RELATED APPLICATIONS

This application is a 371 National Stage application of International Application No. PCT/EP2018/081112, filed Nov. 13, 2018 which claims priority to EP 17202875.5 filed Nov. 21, 2017, the entire contents of which applications are hereby incorporated by reference.

The present invention relates to novel fungicidal compositions for the treatment of phytopathogenic diseases of useful plants, especially phytopathogenic fungi, and to a method of controlling such diseases, and/or fungi, on useful plants.

WO 2016/122802 and WO 2016/109257 disclose certain picolinamide compounds and their uses as fungicides, including (1S)-2,2-bis(4-fluorophenyl)-1-methylethyl N-{[3-(acetyloxy)-4-methoxy-2-pyridyl]carbonyl}-L-alaninate. WO 2018/204437, WO 2018/204435 and WO 2018/204436 disclose certain fungicidal compositions comprising (1S)-2,2-bis(4-fluorophenyl)-1-methylethyl N-{[3-(acetyloxy)-4-methoxy-2-pyridyl]carbonyl}-L-alaninate in combination with another fungicidal active ingredient.

Whilst many fungicidal compounds and compositions, belonging to various different chemical classes, have been/are being developed for use as fungicides in crops of useful plants, crop tolerance and activity against particular phytopathogenic fungi do not always satisfy the needs of agricultural practice in many respects. Therefore, there is a continuing need to find new compounds and compositions having superior biological properties for use in controlling or preventing infestation of plants by phytopathogenic fungi. For example, compounds possessing a greater biological activity, an advantageous spectrum of activity, an increased safety profile, improved physico-chemical properties, increased biodegradability. Or else, compositions possessing a broader spectrum of activity, improved crop tolerance, synergistic interactions or potentiating properties, or compositions which display a more rapid onset of action or which have longer lasting residual activity or which enable a reduction in the number of applications and/or a reduction in the application rate of the compounds and compositions required for effective control of a phytopathogen, thereby enabling beneficial resistance-management practices, reduced environmental impact and reduced operator exposure.

The use of compositions comprising mixtures of different fungicidal compounds possessing different modes of action can address some of these needs (eg, by combining fungicides with differing spectrums of activity).

According to the present invention, there is provided a fungicidal composition comprising a mixture of components (A) and (B) as active ingredients, wherein component (A) is the compound of formula (I):

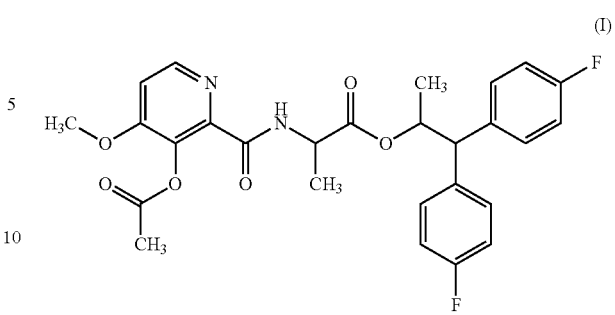

(I)

or an agrochemically acceptable salt, N-oxide, diastereoisomer, enantiomer or tautomer thereof;

and component (B) is selected from:

benzovindiflupyr, isopyrazam, pydiflumetofen, azoxystrobin, difenoconazole, prothioconazole, chlorothalonil, fenpropidin, acibenzolar-S-methyl, cyproconazole, cyprodinil, fenpropimorph, propiconazole, hexaconazole, penconazole, pyrifenox, fludioxonil, pyroquilon, tricyclazole, fluazinam, mandipropamid, metalaxyl, metalaxyl-M, oxadixyl, oxathiapiprolin, paclobutrazol, sulfur, thiabendazole, *Aspergillus Flavus* NRRL 21882 (Afla-Guard®) or *Bacillus subtilis* var. *amyloliquefaciens* Strain FZB24 (Taegro®).

Further according to the invention, there is provided a method of controlling diseases on useful plants or on propagation material thereof caused by phytopathogens, which comprises applying to the useful plants, the locus thereof or propagation material thereof, a composition as defined according to the invention.

Further according to the invention, there is provided the use of a composition comprising component (A) and component (B) as defined according to the invention as a fungicide.

Further according to the invention, there is provided a method of protecting natural substances of plant and/or animal origin, which have been taken from the natural life cycle, and/or their processed forms, which comprises applying to said natural substances of plant and/or animal origin or their processed forms a combination of components (A) and (B) as defined according to the invention.

It has been found that the use of a compound of component (B) in combination with the compound of formula (I) (or the compound of formula (IA)) surprisingly and substantially may enhance the effectiveness of the latter against fungi, and vice versa. Additionally, the use of the compositions of the invention may be effective against a wider spectrum of such fungi than can be combated with the individual active ingredients when used alone.

The benefits provided by certain fungicidal mixture compositions according to the invention may also include, inter alia, advantageous levels of biological activity for protecting plants against diseases that are caused by fungi or superior properties for use as agrochemical active ingredients (for example, greater biological activity, an advantageous spectrum of activity, an increased safety profile, improved physico-chemical properties, or increased biodegradability).

Component (A) in the compositions of the invention is the compound of Formula (I)

(I)

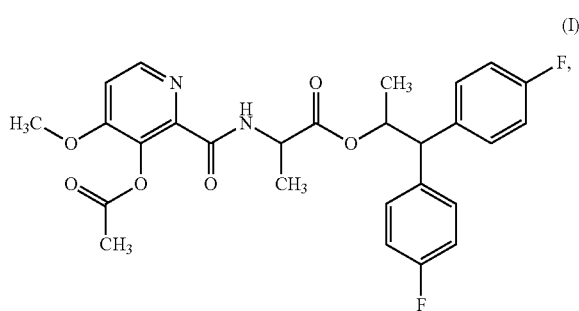 [SMILES: COc1ccnc(C(=O)NC(C)C(=O)OC(C)C(c2ccc(F)cc2)c2ccc(F)cc2)c1OC(C)=O]

or an agrochemically acceptable salt, N-oxide, diastereoisomer, enantiomer or tautomer thereof; or
the compound Formula (IA)

(IA)

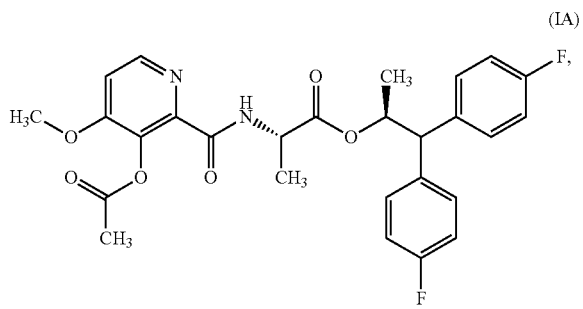 [SMILES: COc1ccnc(C(=O)N[C@@H](C)C(=O)O[C@@H](C)C(c2ccc(F)cc2)c2ccc(F)cc2)c1OC(C)=O]

or an agrochemically acceptable salt, N-oxide or tautomer thereof.

The compound of Formula (IA) is (1S)-2,2-bis(4-fluorophenyl)-1-methylethyl N-{[3-(acetyloxy)-4-methoxy-2-pyridyl]carbonyl}-L-alaninate (florylpicoxamid).

In each case, the compounds of formula (I) according to the invention are in free form, in oxidized form as a N-oxide or in salt form, e.g. an agronomically usable salt form. N-oxides are oxidized forms of tertiary amines or oxidized forms of nitrogen containing heteroaromatic compounds. They are described for instance in the book "Heterocyclic N-oxides" by A. Albini and S. Pietra, CRC Press, Boca Raton 1991.

The component (B) compounds are referred to herein and above by a so-called "ISO common name" or another "common name" being used in individual cases or a trademark name. The component (B) compounds are known and are commercially available and/or can be prepared using procedures known in the art and/or procedures reported in the literature.

Component (B) (CAS Registry number in parentheses) in the compositions of the invention is selected from benzovindiflupyr [1072957-71-1], isopyrazam [881685-58-1], pydiflumetofen [1228284-64-7], azoxystrobin [131860-33-8], difenoconazole [119446-68-3], prothioconazole [178928-70-6], chlorothalonil [1897-45-6], fenpropidin [67306-00-7], acibenzolar-S-methyl [135158-54-2], cyproconazole [94361-06-5], cyprodinil [121552-61-2], fenpropimorph [67564-91-4], propiconazole [60207-90-1], hexaconazole [79983-71-4], penconazole [66246-88-6], pyrifenox [88283-41-4], fludioxonil [131341-86-1], pyroquilon [57369-32-1], tricyclazole [41814-78-2], fluazinam [79622-59-6], mandipropamid [374726-62-2], metalaxyl [57837-19-1], metalaxyl-M [70630-17-0], oxadixyl [77732-09-3], oxathiapiprolin [1003318-67-9], paclobutrazol [76738-62-0], sulfur [7704-34-9], thiabendazole [148-79-8], *Aspergillus Flavus* NRRL 21882 (Afla-Guard®) or *Bacillus subtilis* var. *amyloliquefaciens* Strain FZB24 (Taegro®).

Preferably, component (B) is benzovindiflupyr, isopyrazam, pydiflumetofen, azoxystrobin, difenoconazole, prothioconazole, chlorothalonil, fenpropidin, acibenzolar-S-methyl, cyproconazole, cyprodinil, fenpropimorph, propiconazole, hexaconazole, penconazole, pyrifenox, fludioxonil, pyroquilon or tricyclazole. Even more preferably, component (B) is benzovindiflupyr, isopyrazam, pydiflumetofen, azoxystrobin, difenoconazole, prothioconazole and chlorothalonil.

In a preferred composition according to the invention, component (A) is the compound of Formula (IA) or an agrochemically acceptable salt, N-oxide or tautomer thereof, and component (B) is a compound selected from the group consisting of benzovindiflupyr, isopyrazam, pydiflumetofen, azoxystrobin, difenoconazole, prothioconazole, chlorothalonil, fenpropidin, acibenzolar-S-methyl, cyproconazole, cyprodinil, fenpropimorph, propiconazole, hexaconazole, penconazole, pyrifenox, fludioxonil, pyroquilon or tricyclazole, wherein the weight ratio of component (A) to component (B) is from 50:1 to 1:50.

In a more preferred composition according to the invention, component (A) is the compound of Formula (IA) or an agrochemically acceptable salt, N-oxide or tautomer thereof, and component (B) is a compound selected from the group consisting of benzovindiflupyr, isopyrazam, pydiflumetofen, azoxystrobin, difenoconazole, prothioconazole, chlorothalonil, fenpropidin, acibenzolar-S-methyl, cyproconazole, cyprodinil, fenpropimorph, propiconazole, hexaconazole, penconazole, pyrifenox, fludioxonil, pyroquilon or tricyclazole, wherein the weight ratio of component (A) to component (B) is from 25:1 to 1:25.

In a still more preferred composition according to the invention, component (A) is the compound of Formula (IA) or an agrochemically acceptable salt, N-oxide or tautomer thereof, and component (B) is a compound selected from the group consisting of benzovindiflupyr, isopyrazam, pydiflumetofen, azoxystrobin, difenoconazole, prothioconazole, chlorothalonil, fenpropidin, acibenzolar-S-methyl, cyproconazole, cyprodinil, fenpropimorph, propiconazole, hexaconazole, penconazole, pyrifenox, fludioxonil, pyroquilon or tricyclazole, wherein the weight ratio of component (A) to component (B) is from 5:1 to 1:5.

In a preferred composition according to the invention, component (A) is the compound of Formula (IA) or an agrochemically acceptable salt, N-oxide or tautomer thereof, and component (B) is a compound selected from the group consisting of benzovindiflupyr, isopyrazam, pydiflumetofen, azoxystrobin, difenoconazole, prothioconazole, chlorothalonil, wherein the weight ratio of component (A) to component (B) is from 50:1 to 1:50.

In a more preferred composition according to the invention, component (A) is the compound of Formula (IA) or an agrochemically acceptable salt, N-oxide or tautomer thereof, and component (B) is a compound selected from the group consisting of benzovindiflupyr, isopyrazam, pydiflumetofen, azoxystrobin, difenoconazole, prothioconazole, chlorothalonil, wherein the weight ratio of component (A) to component (B) is from 25:1 to 1:25.

In a still more preferred composition according to the invention, component (A) is the compound of Formula (IA) or an agrochemically acceptable salt, N-oxide or tautomer thereof, and component (B) is a compound selected from the group consisting of benzovindiflupyr, isopyrazam, pydiflumetofen, azoxystrobin, difenoconazole, prothioconazole, chlorothalonil, wherein the weight ratio of component (A) to component (B) is from 5:1 to 1:5.

In even more preferred compositions according to the invention:

Component (A) is the compound of Formula (IA) and component (B) is benzovindiflupyr, Component (A) is the compound of Formula (IA) and component (B) is isopyrazam, Component (A) is the compound of Formula (IA) and component (B) is pydiflumetofen, Component (A) is the compound of Formula (IA) and component (B) is azoxystrobin, Component (A) is the compound of Formula (IA) and component (B) is difenoconazole, Component (A) is the compound of Formula (IA) and component (B) is prothioconazole, or Component (A) is the compound of Formula (IA) and component (B) is chlorothalonil, wherein the weight ratio of component (A) to component (B) is optionally from 50:1 to 1:50, 25:1 to 1:25, 10:1 to 1:10 or 5:1 to 1:5.

In a particularly preferred composition according to the present invention, component (A) is the compound of Formula (IA) and component (B) is pydiflumetofen, wherein the weight ratio of component (A) to component (B) is from 10:1 to 1:10, and still more preferably 5:1 to 1:5.

Any of the preferred fungicidal compositions according to the invention may, in particular, be used to control disease caused by certain phytopathogens on certain useful plants as follows:

Septoria tritici on wheat.
Puccinia recondita on wheat.
Puccinia striiformis on wheat.
Erysiphe graminis on wheat.
Sphaerotheca fuliginea on cucumber/cucurbits.
Mycosphaerella arachidis on peanut.
Mycosphaerella fijiensis on banana.
Cercospora sp. on soybean.
Pyricularia oryzae on rice.
Pyrenophora teres on barley.
Ramularia collo-cygni on barley.
Rhynchosporium secalis on barley.
Colletotrichum lagenarium on cucumber/cucurbits.
Uncinula necator on grape.
Venturia inaequalis on apple.
Phakopsora pachyrhizi on soybean.

Other compounds of component (B) which may be used in the compositions of the present invention include a compound disclosed in:

WO 2016/156085 selected from the compounds 1-(4,5-dimethylbenzimidazol-1-yl)-4,4,6-trifluoro-3,3-dimethyl-isoquinoline, 6-chloro-1-(4,5-dimethylbenzimidazol-1-yl)-4,4-difluoro-3,3-dimethyl-isoquinoline, 6-chloro-4,4-difluoro-1-(5-fluoro-4-methyl-benzimidazol-1-yl)-3,3-dimethyl-isoquinoline, 6-chloro-4,4-difluoro-3,3-dimethyl-1-(4-methylbenzimidazol-1-yl)isoquinoline, 4,4-difluoro-1-(5-fluoro-4-methyl-benzimidazol-1-yl)-3,3-dimethyl-isoquinoline, 1-(4,5-dimethylbenzimidazol-1-yl)-4,4-difluoro-3,3-dimethyl-isoquinoline, 4,4,5-trifluoro-3,3-dimethyl-1-(4-methylbenzimidazol-1-yl)isoquinoline, 1-(4,5-dimethylbenzimidazol-1-yl)-4,4,5-trifluoro-3,3-dimethyl-isoquinoline, 1-(4,5-dimethylbenzimidazol-1-yl)-5-fluoro-3,3,4,4-tetramethyl-isoquinoline, 4,4-difluoro-3,3-dimethyl-1-(4-methylbenzimidazol-1-yl)isoquinoline, 5-fluoro-3,3,4,4-tetramethyl-1-(4-methylbenzimidazol-1-yl)isoquinoline;

WO 2017/025510 selected from the compounds 1-(6-chloro-7-methyl-pyrazolo[1,5-a]pyridin-3-yl)-4,4-difluoro-3,3-dimethyl-isoquinoline, 4,4-difluoro-1-(6-fluoro-7-methyl-pyrazolo[1,5-a]pyridin-3-yl)-3,3-dimethyl-isoquinoline, 1-(6-chloropyrazolo[1,5-a]pyridin-3-yl)-4,4-difluoro-3,3-dimethyl-isoquinoline, 1-(6-ethylpyrazolo[1,5-a]pyridin-3-yl)-4,4-difluoro-3,3-dimethyl-isoquinoline, 4,4-difluoro-3,3-dimethyl-1-(6-methylpyrazolo[1,5-a]pyrid in-3-yl)isoquinoline, 1-(6-bromopyrazolo[1,5-a]pyrid in-3-yl)-4,4-difluoro-3,3-dimethyl-isoquinoline, 1-(6-bromo-7-methyl-pyrazolo[1,5-a]pyridin-3-yl)-4,4-difluoro-3,3-dimethyl-isoquinoline, 1-(6,7-di methyl-pyrazolo[1,5-a]pyridin-3-yl)-4,4,5-trifluoro-3,3-dimethyl-isoquinoline, 1-(6,7-dimethylpyrazolo[1,5-a]pyrid in-3-yl)-4,4,6-trifluoro-3,3-dimethyl-isoquinoline, 4,4-difluoro-3,3-dimethyl-1-(7-methylpyrazolo[1,5-a]pyridin-3-yl)isoquinoline, 1-(6,7-dimethylpyrazolo[1,5-a]pyridin-3-yl)-4,4-difluoro-3,3-dimethyl- isoquinoline, 1-(6,7-dimethylpyrazolo[1,5-a]pyridin-3-yl)-5-fluoro-3,3,4,4-tetramethyl-isoquinoline, 5-fluoro-3,3,4,4-tetramethyl-1-(7-methylpyrazolo[1,5-a]pyrid in-3-yl)isoquinoline 1-(7,8-dimethylimidazo[1,2-a]pyridin-3-yl)-4,4-difluoro-3,3-dimethyl-isoquinoline, 4,4-difluoro-3,3-dimethyl-1-(7-methylimidazo[1,2-a]pyridin-3-yl)isoquinoline, 1-(7,8-dimethylimidazo[1,2-a]pyridin-3-yl)-5-fluoro-3,3,4,4-tetramethyl-isoquinoline, 4,4-difluoro-3,3-dimethyl-1-(8-methylimidazo[1,2-a]pyridin-3-yl) isoquinoline, 5-fluoro-3,3,4,4-tetramethyl-1-(7-methylimidazo[1,2-a]pyridin-3-yl)isoquinoline, 5-fluoro-3,3,4,4-tetramethyl-1-(8-methylimidazo[1,2-a]pyridin-3-yl) isoquinoline;

WO 2017/153380 selected from the compounds N-(1-benzyl-3-chloro-1-methyl-but-3-enyl)-8-fluoro-quinoline-3-carboxamide (or the (S)-enantiomer or (R)-enantiomer thereof), N-(1-benzyl-1,3-dimethyl-butyl)-8-fluoro-quinoline-3-carboxamide (or the (S)-enantiomer or (R)-enantiomer thereof), N-[1-benzyl-1-methyl-2-(1-methylcyclopropyl)ethyl]-8-fluoro-quinoline-3-carboxamide (or the (S)-enantiomer or (R)-enantiomer thereof), N-(1-benzyl-3,3,3-trifluoro-1-methyl-propyl)-8-methyl-quinoline-3-carboxamide (or the (S)-enantiomer or (R)-enantiomer thereof), N-(1-benzyl-3,3,3-trifluoro-1-methyl-propyl)-8-chloro-quinoline-3-carboxamide (or the (S)-enantiomer or (R)-enantiomer thereof), N-(1-benzyl-3,3,3-trifluoro-1-methyl-propyl)-8-fluoro-quinoline-3-carboxamide (or the (S)-anantiomer or (R)-enantiomer thereof), N-(1-benzyl-3,3,3-trifluoro-1-methyl-propyl)-7,8-difluoro-quinoline-3-carboxamide (or the (S)-enantiomer or (R)-enantiomer thereof), N-(1-benzyl-1,3-dimethyl-butyl)-7,8-difluoro-quinoline-3-carboxamide (or the (S)-enantiomer or (R)-enantiomer thereof), N-(1-benzyl-1,3-dimethyl-but-3-enyl)-8-fluoro-quinoline-3-carboxamide, N-(1-benzyl-1,3-dimethyl-but-3-enyl)-7,8-difluoro-quinoline-3-carboxamide (or the (S)-enantiomer or (R)-enantiomer thereof), 8-fluoro-N-[1-[(3-fluorophenyl)methyl]-1,3-dimethyl-butyl]quinoline-3-carboxamide (or the (S)-enantiomer or (R)-enantiomer thereof), 8-fluoro-N-[3,3,3-trifluoro-1-[(3-fluorophenyl)methyl]-1-methyl-propyl]quinoline-3-carboxamide (or the (S)-enantiomer or (R)-enantiomer thereof), N-[1-benzyl-2-(1-fluorocyclopropyl)-1-methyl-ethyl]-8-fluoro-quinoline-3-carboxamide (or the (S)-enantiomer or (R)-enantiomer thereof), N-(1-benzyl-3,3-difluoro-1-methyl-butyl)-8-fluoro-quinoline-3-carboxamide (or the (S)-enantiomer or (R)-enantiomer thereof), N-(1-benzyl-3-fluoro-1,3-dimethyl-butyl)-8-fluoro-quinoline-3-carboxamide (or the (S)-enantiomer or (R)-enantiomer thereof), N-(1-benzyl-1,3,3-trimethyl-butyl)-8-fluoro-quinoline-3-carboxamide (or the (S)-enantiomer or (R)-enantiomer thereof), N-(1-benzyl-1,3-dimethyl-butyl)-8-methyl-quinoline-3-carboxamide (or the (S)-enantiomer or (R)-enantiomer thereof), N-(1-benzyl- 1,3-dimethyl-butyl)-8-chloro-quinoline-3-carboxamide, N-(1-benzyl-1,3-dimethyl-butyl)quinoline-3-carboxamide (or the (S)-enantiomer or (R)-enantiomer thereof), N-(1-benzyl-3,3,3-trifluoro-1-methyl-propyl)quinoline-3-carboxamide (or the (S)-enantiomer or (R)-enantiomer thereof);

WO 2015/155075 selected from the compounds N'-[5-bromo-2-methyl-6-[(1S)-1-methyl-2-propoxy-ethoxy]-3-pyridyl]-N-ethyl-N-methyl formamidine, N'-[5-bromo-2-methyl-6-(1-methyl-2-propoxy-ethoxy)-3-pyridyl]-N-ethyl-N-methyl-formamidine, N'-[5-bromo-2-methyl-6-[(1R)-1-methyl-2-propoxy-ethoxy]-3-pyridyl]-N-ethyl-N-methyl-formamidine, N'-[6-(2-allyloxy-1-methyl-ethoxy)-5-chloro-2-methyl-3-pyridyl]-N-ethyl-N-methyl-formamidine, N'-[5-cyano-2-methyl-6-(1-methyl-2-propoxy-ethoxy)-3-pyridyl]-N-ethyl-N-methyl-formamidine, N'-[5-chloro-2-methyl-6-(1-methyl-2-propoxy-ethoxy)-3-pyridyl]-N-ethyl-N-methyl-formamidine, N'-[5-(difluoromethyl)-2-methyl-6-(1-methyl-2-propoxy-ethoxy)-3-pyridyl]-N-ethyl-N-methyl-formamidine, N'-[5-bromo-2-methyl-6-(1-methyl-2-propoxy-ethoxy)-3-pyridyl]-N-isopropyl-N-methyl-formamidine, N'-[2,5-dimethyl-6-(1-methyl-2-propoxy-ethoxy)-3-pyridyl]-N-ethyl-N-methyl-formamidine; or WO 2017/102635 selected from the compounds N'-[4-[(3E)-3-ethoxyimino-1-hydroxy-1-(trifluoromethyl)butyl]-5-methoxy-2-methyl-phenyl]-N-ethyl-N-methyl-formamidine, N'-[4-[1-(butoxymethyl)-2,2,2-trifluoro-1-hydroxy-ethyl]-5-methoxy-2-methyl-phenyl]-N-ethyl-N-methyl-formamidine, N'-[4-(1-cyclopropyl-2,2,2-trifluoro-1-hydroxy-ethyl)-5-methoxy-2-methyl-phenyl]-N-isopropyl-N-methyl-formamidine, N'-[4-[1-(cyclobutylmethoxymethyl)-2,2,2-trifluoro-1-hydroxy-ethyl]-5-methoxy-2-methyl-phenyl]-N-ethyl-N-methyl-formamidine, N'-[4-[1-(cyclopentoxymethyl)-2,2,2-trifluoro-1-hydroxy-ethyl]-5-methoxy-2-methyl-phenyl]-N-ethyl-N-methyl-formamidine, N'-[4-[1-hydroxy-3-methyl-1-(trifluoromethyl)but-3-enyl]-5-methoxy-2-methyl-phenyl]-N-isopropyl-N-methyl-formamidine, N'-[4-[1-hydroxy-1-(trifluoromethyl)pentyl]-5-methoxy-2-methyl-phenyl]-N-isopropyl-N-methyl-formamidine, N-isopropyl-N'-[5-methoxy-2-methyl-4-(2,2,2-trifluoro-1-hydroxy-1-phenyl-ethyl)phenyl]-N-methyl-formamidine, N-ethyl-N'-[5-methoxy-2-methyl-4-[2,2,2-trifluoro-1-hydroxy-1-(o-tolyl)ethyl]phenyl]-N-methyl-formamidine, N'-[4-[1-(3,5-difluorophenyl)-2,2,2-trifluoro-1-hydroxy-ethyl]-5-methoxy-2-methyl-phenyl]-N-ethyl-N-methyl-formamidine, wherein the weight ratio of component (A) to a compound of component (B) (as disclosed in WO 2016/156085, WO 2017/025510, WO 2017/153380, WO 2015/155075 or WO 2017/102635) is from 50:1 to 1:50, 25:1 to 1:25, 10:1 to 1:10 or 5:1 to 1:5.

In general, the weight ratio of component (A) to component (B) in the compositions of the invention is from 1000:1 to 1:1000, especially from 100:1 to 1:100, more especially in a ratio from 50:1 to 1:50, even more especially in a ratio of from 25:1 to 1:25, even more especially still from 10:1 to 1:10, very especially from 5:1 and 1:5, and in particular from 5:2 to 2:5. Specific individual ratios that are preferred include the ratio of 1:1, 5:1, 5:2, 5:3, 5:4, 4:1, 4:2, 4:3, 3:1, 3:2, 2:1, 1:5, 2:5, 3:5, 4:5, 1:4, 2:4, 3:4, 1:3, 2:3, 1:2, 1:600, 1:300, 1:150, 1:100, 1:50, 1:40, 1:35, 1:20, 2:35, 4:35, 1:10 1:75, 2:75, 4:75, 1:6000, 1:3000, 1:1500, 1:350, 2:350, 4:350, 1:750, 2:750, and 4:750. Out of these, 1:100, 1:50, 1:25, 1:10, 1:5 and 2:5 may be particularly preferred.

It has been found, surprisingly, that certain weight ratios of component (A) to component (B) are able to give rise to synergistic activity. Therefore, a further aspect of the invention are compositions, wherein component (A) and component (B) are present in the composition in amounts producing a synergistic effect. This synergistic activity is apparent from the fact that the fungicidal activity of the composition comprising component (A) and component (B) is greater than the sum of the fungicidal activities of component (A) and component (B). This synergistic activity extends the range of action of component (A) and component (B) in two ways. Firstly, the rates of application of component (A) and component (B) are lowered whilst the action remains equally good, meaning that the active ingredient mixture still achieves a high degree of phytopathogen control even where the two individual components have become totally ineffective in such a low application rate range. Secondly, there is a substantial broadening of the spectrum of phytopathogens that can be controlled.

A synergistic effect exists whenever the action of an active ingredient combination is greater than the sum of the actions of the individual components. The action to be expected E for a given active ingredient combination obeys the so-called COLBY formula and can be calculated as follows (COLBY, S. R. "Calculating synergistic and antagonistic responses of herbicide combination", Weeds, Vol. 15, pages 20-22; 1967):

ppm=milligrams of active ingredient (=a.i.) per liter of spray mixture

X=% action by active ingredient (A) using p ppm of active ingredient

Y=% action by active ingredient (B) using q ppm of active ingredient.

According to COLBY, the expected (additive) action of active ingredients (A)+(B) using p+q ppm of active ingredient is $$E = X + Y - \frac{X \cdot Y}{100}$$

If the action actually observed (O) is greater than the expected action (E), then the action of the combination is super-additive, i.e. there is a synergistic effect. In mathematical terms, synergism corresponds to a positive value for the difference of (O-E). In the case of purely complementary addition of activities (expected activity), said difference (O-E) is zero. A negative value of said difference (O-E) signals a loss of activity compared to the expected activity.

However, besides the actual synergistic action with respect to fungicidal activity, the compositions according to the invention can also have further surprising advantageous properties. Examples of such advantageous properties that may be mentioned are: more advantageous degradability; improved toxicological and/or ecotoxicological behaviour; or improved characteristics of the useful plants including: emergence, crop yields, more developed root system, tillering increase, increase in plant height, bigger leaf blade, less dead basal leaves, stronger tillers, greener leaf colour, less fertilizers needed, less seeds needed, more productive tillers, earlier flowering, early grain maturity, less plant verse (lodging), increased shoot growth, improved plant vigor, and early germination.

The compositions of the invention may in certain circumstances comprise an additional active ingredient component (C), which is different to component (B), wherein component (C) is selected from the group consisting of: benzovindiflupyr, isopyrazam, pydiflumetofen, azoxystrobin, difenoconazole, prothioconazole, chlorothalonil, fenpropidin, acibenzolar-S-methyl, cyproconazole, cyprodinil, fenpropimorph, propiconazole, hexaconazole, penconazole, pyrifenox, fludioxonil, pyroquilon, tricyclazole, fluazinam, mandipropamid, metalaxyl, metalaxyl-M, oxadixyl, oxathiapiprolin, paclobutrazol, sulfur, thiabendazole, *Aspergillus Flavus* NRRL 21882 (Afla-Guard®) or *Bacillus subtilis* var. *amyloliquefaciens* Strain FZB24 (Taegro®), where synergistic action between active ingredients may be observed.

In embodiments of the invention where the compositions comprise a component (A), component (B) and component (C), the weight ratio of component (A) to component (B) to component (C), may be selected from 20:1:1, 1:20:1, 1:1:20, 10:1:1, 1:10:1, 1:1:10, 5:2:1, 2:1:5, 1:5:2, 5:1:1, 1:5:1, 1:1:5, 2:1:1, 1:2:1, 1:1:2 or 1:1:1.

In particular:

The composition of the invention may comprise a fungicidal active ingredient combination comprising the compound of formula (IA)+benzovindiflupyr+a single compound selected from component (C), wherein the weight ratio of the active ingredients is 5:2:1.

The composition of the invention may comprise a fungicidal active ingredient combination comprising the compound of formula (IA)+isopyrazam+a single compound selected from component (C), wherein the weight ratio of the active ingredients is 5:2:1.

The composition of the invention may comprise a fungicidal active ingredient combination comprising the compound of formula (IA)+pydiflumetofen+a single compound selected from component (C), wherein the weight ratio of the active ingredients is 5:2:1.

The composition of the invention may comprise a fungicidal active ingredient combination comprising the compound of formula (IA)+azoxystrobin+a single compound selected from component (C), wherein the weight ratio of the active ingredients is 5:2:1.

The composition of the invention may comprise a fungicidal active ingredient combination comprising the compound of formula (IA)+difenoconazole+a single compound selected from component (C), wherein the weight ratio of the active ingredients is 5:2:1.

The composition of the invention may comprise a fungicidal active ingredient combination comprising the compound of formula (IA)+prothioconazole+a single compound selected from component (C), wherein the weight ratio of the active ingredients is 5:2:1.

The composition of the invention may comprise a fungicidal active ingredient combination comprising the compound of formula (IA)+chlorothalonil+a single compound selected from component (C), wherein the weight ratio of the active ingredients is 5:2:1.

The composition of the invention may comprise a fungicidal active ingredient combination comprising the compound of formula (IA)+benzovindiflupyr+a single compound selected from component (C), wherein the weight ratio of the active ingredients is 2:1:5.

The composition of the invention may comprise a fungicidal active ingredient combination comprising the compound of formula (IA)+isopyrazam+a single compound selected from component (C), wherein the weight ratio of the active ingredients is 2:1:5.

The composition of the invention may comprise a fungicidal active ingredient combination comprising the compound of formula (IA)+pydiflumetofen+a single compound selected from component (C), wherein the weight ratio of the active ingredients is 2:1:5.

The composition of the invention may comprise a fungicidal active ingredient combination comprising the compound of formula (IA)+azoxystrobin+a single compound selected from component (C), wherein the weight ratio of the active ingredients is 2:1:5.

The composition of the invention may comprise a fungicidal active ingredient combination comprising the compound of formula (IA)+difenoconazole+a single compound selected from component (C), wherein the weight ratio of the active ingredients is 2:1:5.

The composition of the invention may comprise a fungicidal active ingredient combination comprising the compound of formula (IA)+prothioconazole+a single compound selected from component (C), wherein the weight ratio of the active ingredients is 2:1:5.

The composition of the invention may comprise a fungicidal active ingredient combination comprising the compound of formula (IA)+chlorothalonil+a single compound selected from component (C), wherein the weight ratio of the active ingredients is 2:1:5.

The composition of the invention may comprise a fungicidal active ingredient combination comprising the compound of formula (IA)+benzovindiflupyr+a single compound selected from component (C), wherein the weight ratio of the active ingredients is 1:5:2.

The composition of the invention may comprise a fungicidal active ingredient combination comprising the compound of formula (IA)+isopyrazam+a single compound selected from component (C), wherein the weight ratio of the active ingredients is 1:5:2.

The composition of the invention may comprise a fungicidal active ingredient combination comprising the compound of formula (IA)+pydiflumetofen+a single compound selected from component (C), wherein the weight ratio of the active ingredients is 1:5:2.

The composition of the invention may comprise a fungicidal active ingredient combination comprising the compound of formula (IA)+azoxystrobin+a single compound selected from component (C), wherein the weight ratio of the active ingredients is 1:5:2.

The composition of the invention may comprise a fungicidal active ingredient combination comprising the compound of formula (IA)+difenoconazole+a single compound selected from component (C), wherein the weight ratio of the active ingredients is 1:5:2.

The composition of the invention may comprise a fungicidal active ingredient combination comprising the compound of formula (IA)+prothioconazole+a single compound selected from component (C), wherein the weight ratio of the active ingredients is 1:5:2.

Each of these ternary active ingredient mixture compositions may be particularly useful in controlling *Septoria tritici* and a rust species on wheat.

Some compositions according to the invention have a systemic action and can be used as foliar, soil and seed treatment fungicides.

With the compositions according to the invention it is possible to inhibit or destroy the phytopathogenic microorganisms which occur in plants or in parts of plants (fruit, blossoms, leaves, stems, tubers, roots) in different useful plants, while at the same time the parts of plants which grow later are also protected from attack by phytopathogenic microorganisms.

The compositions according to the invention can be applied to the phytopathogenic microorganisms, the useful plants, the locus thereof, the propagation material thereof, storage goods or technical materials threatened by microorganism attack.

The compositions according to the invention may be applied before or after infection of the useful plants, the propagation material thereof, storage goods or technical materials by the microorganisms.

A further aspect of the present invention is a method of controlling diseases on useful plants or on propagation material thereof caused by phytopathogens, which comprises applying to the useful plants, the locus thereof or propagation material thereof a composition according to the invention. Preferred is a method, which comprises applying to the useful plants or to the locus thereof a composition according to the invention, more preferably to the useful plants. Further preferred is a method, which comprises applying to the propagation material of the useful plants a composition according to the invention.

Throughout this document the expression "composition" means the various mixtures or combinations of components (A) and (B), for example in a single "ready-mix" form, in a combined spray mixture composed from separate formulations of the single active ingredient components, such as a "tank-mix", and in a combined use of the single active ingredients when applied in a sequential manner, i.e. one after the other with a reasonably short period, such as a few hours or days. The order of applying the components (A) and (B) is not essential for working the present invention.

The active ingredient combinations are effective against harmful microorganisms, such as microorganisms, that cause phytopathogenic diseases, in particular against phytopathogenic fungi and bacteria.

The active ingredient combinations may be effective especially against phytopathogenic fungi belonging to the following classes: Ascomycetes (e.g. *Venturia, Podosphaera, Erysiphe, Monilinia, Mycosphaerella, Uncinula*); Basidiomycetes (e.g. the genus *Hemileia, Rhizoctonia, Phakopsora, Puccinia, Ustilago, Tilletia*); Fungi imperfecti (also known as Deuteromycetes; e.g. *Botrytis, Helminthosporium, Rhynchosporium, Fusarium, Septoria, Cercospora, Alternaria, Pyricularia* and *Pseudocercosporella*); Oomycetes (e.g. *Phytophthora, Peronospora, Pseudoperonospora, Albugo, Bremia, Pythium, Pseudosclerospora, Plasmopara*). Preferably, the compositions of the present invention may be effective and used against phytopathogenic fungi belonging to the following genera: *Septoria, Mycosphaerella, Pyricularia, Pyrenophora, Colletotrichum, Uncinula, Venturia, Ramularia, Erysiphe, Puccinia* or *Phakopsora*. In particular, from these genera, the phytopathogenic fungi *Septoria tritici, Mycosphaerella arachidis, Pyricularia oryzae, Pyrenophora teres, Colletotrichum lagenarium, Venturia inaequalis* or *Ramularia collo-cygni*.

The active ingredient compositions of the present invention comprising the compound of Formula (IA), in particular, those comprising benzovindiflupyr, chlorothalonil, pydiflumetofen or azoxystrobin as component (B), may be particularly effective against *Pyricularia oryzae* or *Mycosphaerella arachidis*. In particular, active ingredient compositions comprising the compound of Formula (IA) with component (B) as benzovindiflupyr, chlorothalonil or azoxystrobin may be particularly effective against *Pyricularia oryzae*, and active ingredient compositions comprising the compound of Formula (IA) with component (B) as pydiflumetofen may be particularly effective against *Mycosphaerella arachidis*. Such compositions may have a weight ratio of component (A) to component (B) of from 10:1 to 1:10, and preferably, from 5:1 to 1:5.

According to the invention "useful plants" typically comprise the following species of plants: grape vines; cereals, such as wheat, barley, rye or oats; rice; beet, such as sugar beet or fodder beet; fruits, such as pomes, stone fruits or soft fruits, for example apples, pears, plums, peaches, almonds, cherries, strawberries, raspberries or blackberries; leguminous plants, such as beans, lentils, peas or soybeans; oil plants, such as rape, mustard, poppy, olives, sunflowers, coconut, castor oil plants, cocoa beans or groundnuts; cucumber plants, such as marrows, cucumbers or melons; fibre plants, such as cotton, flax, hemp or jute; citrus fruit, such as oranges, lemons, grapefruit or mandarins; vegetables, such as spinach, lettuce, asparagus, cabbages, carrots, onions, tomatoes, potatoes, cucurbits or paprika; lauraceae, such as avocados, cinnamon or camphor; maize; tobacco; nuts (including peanuts); coffee; sugar cane; tea; vines; hops; durian; bananas; natural rubber plants; turf or ornamentals, such as flowers (including roses), shrubs, broad-leaved trees or evergreens, for example conifers. This list does not represent any limitation, however, preferably, the useful plant may be selected from wheat, barley, rice, soybean, apples, grapes, cucumber, peanuts or bananas.

The term "useful plants" is to be understood as including also useful plants that have been rendered tolerant to herbicides like bromoxynil or classes of herbicides (such as, for example, HPPD inhibitors, ALS inhibitors, for example primisulfuron, prosulfuron and trifloxysulfuron, EPSPS (5-enol-pyrovyl-shikimate-3-phosphate-synthase) inhibitors, GS (glutamine synthetase) inhibitors) as a result of conventional methods of breeding or genetic engineering. An example of a crop that has been rendered tolerant to imidazolinones, e.g. imazamox, by conventional methods of breeding (mutagenesis) is Clearfield® summer rape (Canola). Examples of crops that have been rendered tolerant to herbicides or classes of herbicides by genetic engineering methods include glyphosate- and glufosinate-resistant maize varieties commercially available under the trade names RoundupReady®, Herculex I® and LibertyLink®.

The term "useful plants" is to be understood as including also useful plants which have been so transformed by the use of recombinant DNA techniques that they are capable of synthesising one or more selectively acting toxins, such as are known, for example, from toxin-producing bacteria, especially those of the genus *Bacillus*.

Toxins that can be expressed by such transgenic plants include, for example, insecticidal proteins, for example insecticidal proteins from *Bacillus cereus* or *Bacillus popliae*; or insecticidal proteins from *Bacillus thuringiensis*, such as δ-endotoxins, e.g. CryIA(b), CryIA(c), CryIF, CryIF (a2), CryIIA(b), CryIIIA, CryIIIB(b1) or Cry9c, or vegetative insecticidal proteins (VIP), e.g. VIP1, VIP2, VIP3 or VIP3A; or insecticidal proteins of bacteria colonising nematodes, for example *Photorhabdus* spp. or *Xenorhabdus* spp., such as *Photorhabdus luminescens, Xenorhabdus nematophilus*; toxins produced by animals, such as scorpion toxins, arachnid toxins, wasp toxins and other insect-specific neurotoxins; toxins produced by fungi, such as *Streptomycetes* toxins, plant lectins, such as pea lectins, barley lectins or snowdrop lectins; agglutinins; proteinase inhibitors, such as trypsine inhibitors, serine protease inhibitors, patatin, cystatin, papain inhibitors; ribosome-inactivating proteins (RIP), such as ricin, maize-RIP, abrin, luffin, saporin or bryodin; steroid metabolism enzymes, such as 3-hydroxysteroidoxidase, ecdysteroid-UDP-glycosyl-transferase, cholesterol oxidases, ecdysone inhibitors, HMG-COA-reductase, ion channel blockers, such as blockers of sodium or calcium channels, juvenile hormone esterase, diuretic hormone receptors, stilbene synthase, bibenzyl synthase, chitinases and glucanases.

In the context of the present invention there are to be understood by δ-endotoxins, for example CryIA(b), CryIA (c), CryIF, CryIF(a2), CryIIA(b), CryIIIA, CryIIIB(b1) or Cry9c, or vegetative insecticidal proteins (VIP), for example VIP1, VIP2, VIP3 or VIP3A, expressly also hybrid toxins, truncated toxins and modified toxins. Hybrid toxins are produced recombinantly by a new combination of different domains of those proteins (see, for example, WO 02/15701). An example for a truncated toxin is a truncated CryIA(b), which is expressed in the Bt11 maize from Syngenta Seed SAS, as described below. In the case of modified toxins, one or more amino acids of the naturally occurring toxin are replaced. In such amino acid replacements, preferably non-naturally present protease recognition sequences are inserted into the toxin, such as, for example, in the case of CryIIIA055, a cathepsin-D-recognition sequence is inserted into a CryIIIA toxin (see WO 03/018810)

Examples of such toxins or transgenic plants capable of synthesising such toxins are disclosed, for example, in EP-A-0 374 753, WO 93/07278, WO 95/34656, EP-A-0 427 529, EP-A-451 878 and WO 03/052073.

The processes for the preparation of such transgenic plants are generally known to the person skilled in the art and are described, for example, in the publications mentioned above. CryI-type deoxyribonucleic acids and their preparation are known, for example, from WO 95/34656, EP-A-0 367 474, EP-A-0 401 979 and WO 90/13651.

The toxin contained in the transgenic plants imparts to the plants tolerance to harmful insects. Such insects can occur in any taxonomic group of insects, but are especially commonly found in the beetles (Coleoptera), two-winged insects (Diptera) and butterflies (Lepidoptera).

Transgenic plants containing one or more genes that code for an insecticidal resistance and express one or more toxins are known and some of them are commercially available. Examples of such plants are: YieldGard® (maize variety that expresses a CryIA(b) toxin); YieldGard Rootworm® (maize variety that expresses a CryIIIB(b1) toxin); YieldGard Plus® (maize variety that expresses a CryIA(b) and a CryIIIB(b1) toxin); Starlink® (maize variety that expresses a Cry9(c) toxin); Herculex I® (maize variety that expresses a CryIF(a2) toxin and the enzyme phosphinothricine N-acetyltransferase (PAT) to achieve tolerance to the herbicide glufosinate ammonium); NuCOTN 33B® (cotton variety that expresses a CryIA(c) toxin); Bollgard I® (cotton variety that expresses a CryIA(c) toxin); Bollgard II® (cotton variety that expresses a CryIA(c) and a CryIIA(b) toxin); VIPCOT® (cotton variety that expresses a VIP toxin); NewLeaf® (potato variety that expresses a CryIIIA toxin); NatureGard® and Protecta®.

Further examples of such transgenic crops are:

1. Bt11 Maize from Syngenta Seeds SAS, Chemin de l'Hobit 27, F-31 790 St. Sauveur, France, registration number C/FR/96/05/10. Genetically modified *Zea mays* which has been rendered resistant to attack by the European corn borer (*Ostrinia nubilalis* and *Sesamia nonagrioides*) by transgenic expression of a truncated CryIA(b) toxin. Bt11 maize also transgenically expresses the enzyme PAT to achieve tolerance to the herbicide glufosinate ammonium.

2. Bt176 Maize from Syngenta Seeds SAS, Chemin de l'Hobit 27, F-31 790 St. Sauveur, France, registration number C/FR/96/05/10. Genetically modified *Zea mays* which has been rendered resistant to attack by the European corn borer (*Ostrinia nubilalis* and *Sesamia nonagrioides*) by transgenic expression of a CryIA(b) toxin. Bt176 maize also transgenically expresses the enzyme PAT to achieve tolerance to the herbicide glufosinate ammonium.

3. MIR604 Maize from Syngenta Seeds SAS, Chemin de l'Hobit 27, F-31 790 St. Sauveur, France, registration number C/FR/96/05/10. Maize which has been rendered insect-resistant by transgenic expression of a modified CryIIIA toxin. This toxin is Cry3A055 modified by insertion of a cathepsin-D-protease recognition sequence. The preparation of such transgenic maize plants is described in WO 03/018810.

4. MON 863 Maize from Monsanto Europe S.A. 270-272 Avenue de Tervuren, B-1150 Brussels, Belgium, registration number C/DE/02/9. MON 863 expresses a CryIIIB(b1) toxin and has resistance to certain Coleoptera insects.

5. IPC 531 Cotton from Monsanto Europe S.A. 270-272 Avenue de Tervuren, B-1150 Brussels, Belgium, registration number C/ES/96/02.

6. 1507 Maize from Pioneer Overseas Corporation, Avenue Tedesco, 7 B-1160 Brussels, Belgium, registration number C/NL/00/10. Genetically modified maize for the expression of the protein Cry1F for achieving resistance to certain Lepidoptera insects and of the PAT protein for achieving tolerance to the herbicide glufosinate ammonium.

7. NK603×MON 810 Maize from Monsanto Europe S.A. 270-272 Avenue de Tervuren, B-1150 Brussels, Belgium, registration number C/GB/02/M3/03. Consists of conventionally bred hybrid maize varieties by crossing the genetically modified varieties NK603 and MON 810. NK603× MON 810 Maize transgenically expresses the protein CP4 EPSPS, obtained from *Agrobacterium* sp. strain CP4, which imparts tolerance to the herbicide Roundup® (contains glyphosate), and also a CryIA(b) toxin obtained from *Bacillus thuringiensis* subsp. *kurstaki* which brings about tolerance to certain Lepidoptera, include the European corn borer.

Transgenic crops of insect-resistant plants are also described in BATS (Zentrum für Biosicherheit and Nachhaltigkeit, Zentrum BATS, Clarastrasse 13, 4058 Basel, Switzerland) Report 2003, (http://bats.ch).

The term "useful plants" is to be understood as including also useful plants which have been so transformed by the use of recombinant DNA techniques that they are capable of synthesising antipathogenic substances having a selective action, such as, for example, the so-called "pathogenesis-related proteins" (PRPs, see e.g. EP-A-0 392 225). Examples of such antipathogenic substances and transgenic plants capable of synthesising such antipathogenic substances are known, for example, from EP-A-0 392 225, WO 95/33818, and EP-A-0 353 191. The methods of producing such transgenic plants are generally known to the person skilled in the art and are described, for example, in the publications mentioned above.

Antipathogenic substances which can be expressed by such transgenic plants include, for example, ion channel blockers, such as blockers for sodium and calcium channels, for example the viral KP1, KP4 or KP6 toxins; stilbene synthases; bibenzyl synthases; chitinases; glucanases; the so-called "pathogenesis-related proteins" (PRPs; see e.g. EP-A-0 392 225); antipathogenic substances produced by microorganisms, for example peptide antibiotics or heterocyclic antibiotics (see e.g. WO 95/33818) or protein or polypeptide factors involved in plant pathogen defence (so-called "plant disease resistance genes", as described in WO 03/000906).

The term "locus" of a useful plant as used herein is intended to embrace the place on which the useful plants are growing, where the plant propagation materials of the useful plants are sown or where the plant propagation materials of the useful plants will be placed into the soil. An example for such a locus is a field, on which crop plants are growing.

The term "plant propagation material" is understood to denote generative parts of a plant, such as seeds, which can be used for the multiplication of the latter, and vegetative material, such as cuttings or tubers, for example potatoes. There may be mentioned for example seeds (in the strict sense), roots, fruits, tubers, bulbs, rhizomes and parts of plants. Germinated plants and young plants which are to be transplanted after germination or after emergence from the soil, may also be mentioned. These young plants may be protected before transplantation by a total or partial treatment by immersion. Preferably "plant propagation material" is understood to denote seeds.

A futher aspect of the instant invention is a method of protecting natural substances of plant and/or animal origin, which have been taken from the natural life cycle, and/or their processed forms against attack of fungi, which comprises applying to said natural substances of plant and/or animal origin or their processed forms a combination of components (A) and (B).

According to the instant invention, the term "natural substances of plant origin, which have been taken from the natural life cycle" denotes plants or parts thereof which have been harvested from the natural life cycle and which are in the freshly harvested form. Examples of such natural substances of plant origin are stalks, leafs, tubers, seeds, fruits or grains. According to the instant invention, the term "processed form of a natural substance of plant origin" is understood to denote a form of a natural substance of plant origin that is the result of a modification process. Such modification processes can be used to transform the natural substance of plant origin in a more storable form of such a substance (a storage good). Examples of such modification processes are pre-drying, moistening, crushing, comminuting, grounding, compressing or roasting. Also falling under the definition of a processed form of a natural substance of plant origin is timber, whether in the form of crude timber, such as construction timber, electricity pylons and barriers, or in the form of finished articles, such as furniture or objects made from wood.

According to the instant invention, the term "natural substances of animal origin, which have been taken from the natural life cycle and/or their processed forms" is understood to denote material of animal origin such as skin, hides, leather, furs, hairs and the like, and does not refer to that material when it is present on a live animal. Thus the invention does not extend to a method of treatment of a live animal.

The combinations according the present invention can prevent disadvantageous effects such as decay, discoloration or mold.

A preferred embodiment is a method of protecting natural substances of plant origin, which have been taken from the natural life cycle, and/or their processed forms against attack of fungi, which comprises applying to said natural substances of plant and/or animal origin or their processed forms a combination of components (A) and (B) in a synergistically effective amount.

A further preferred embodiment is a method of protecting fruits, preferably pomes, stone fruits, soft fruits and citrus fruits, which have been taken from the natural life cycle, and/or their processed forms, which comprises applying to said fruits and/or their processed forms a combination of components (A) and (B) in a synergistically effective amount.

The combinations of the present invention may also be used in the field of protecting industrial material against attack of fungi. According to the instant invention, the term "industrial material" denotes non-live material which have been prepared for use in industry. For example, industrial materials which are intended to be protected against attack of fungi can be glues, sizes, paper, board, textiles, carpets, leather, wood, constructions, paints, plastic articles, cooling lubricants, aqueous hydraulic fluids and other materials which can be infested with, or decomposed by, microorganisms. Cooling and heating systems, ventilation and air conditioning systems and parts of production plants, for example cooling-water circuits, which may be impaired by multiplication of microorganisms may also be mentioned from amongst the materials to be protected. The combinations according the present invention can prevent disadvantageous effects such as decay, discoloration or mold.

The combinations of the present invention may also be used in the field of protecting technical material against attack of fungi. According to the instant invention, the term "technical material" includes paper; carpets; constructions; cooling and heating systems; ventilation and air conditioning systems and the like. The combinations according the present invention can prevent disadvantageous effects such as decay, discoloration or mold.

The combinations according to the present invention are particularly effective against powdery mildews; rusts; leafspot species; early blights and molds; especially against *Septoria*, *Puccinia*, *Erysiphe*, *Pyrenophora* and *Tapesia* in cereals; *Phakopsora* in soybeans; *Hemileia* in coffee; *Phragmidium* in roses; *Alternaria* in potatoes, tomatoes and cucurbits; *Sclerotinia* in turf, vegetables, sunflower and oil seed rape; black rot, red fire, powdery mildew, grey mold and dead arm disease in vine; *Botrytis cinerea* in fruits; *Monilinia* spp. in fruits and *Penicillium* spp. in fruits.

The combinations according to the present invention are furthermore particularly effective against seedborne and soilborne diseases, such as *Alternaria* spp., *Ascochyta* spp., *Botrytis cinerea*, *Cercospora* spp., Claviceps purpurea, *Cochliobolus sativus*, *Colletotrichum* spp., *Epicoccum* spp., *Fusarium graminearum*, *Fusarium moniliforme*, *Fusarium oxysporum*, *Fusarium proliferatum*, *Fusarium solani*, *Fusarium subglutinans*, *Gäumannomyces graminis*, *Helminthosporium* spp., *Microdochium nivale*, *Phoma* spp., *Pyrenophora graminea*, *Pyricularia oryzae*, *Rhizoctonia solani*, *Rhizoctonia cerealis*, *Sclerotinia* spp., *Septoria* spp., *Sphacelotheca reilliana*, *Tilletia* spp., *Typhula incarnate*, *Urocystis occulta*, *Ustilago* spp. or *Verticillium* spp.; in particular against pathogens of cereals, such as wheat, barley, rye or oats; maize; rice; cotton; soybean; turf; sugarbeet; oil seed rape; potatoes; pulse crops, such as peas, lentils or chickpea; and sunflower.

The combinations according to the present invention are furthermore particularly effective against post harvest diseases such as *Botrytis cinerea, Colletotrichum musae, Curvularia lunata, Fusarium semitecum, Geotrichum candidum, Monilinia fructicola, Monilinia fructigena, Monilinia laxa, Mucor piriformis, Penicilium italicum, Penicilium solitum, Penicillium digitatum or Penicillium expansum* in particular against pathogens of fruits, such as pomefruits, for example apples and pears, stone fruits, for example peaches and plums, citrus, melons, papaya, kiwi, mango, berries, for example strawberries, avocados, pomegranates and bananas, and nuts.

The amount of a combination of the invention to be applied, will depend on various factors, such as the compounds employed; the subject of the treatment, such as, for example plants, soil or seeds; the type of treatment, such as, for example spraying, dusting or seed dressing; the purpose of the treatment, such as, for example prophylactic or therapeutic; the type of fungi to be controlled or the application time.

The compositions comprising component (A) (a compound of formula (I) or (IA)) in combination with component (B) can be applied, for example, in a single "ready-mix" form, in a combined spray mixture composed from separate formulations of the single active ingredient components, such as a "tank-mix", and in a combined use of the single active ingredients when applied in a sequential manner, i.e. one after the other with a reasonably short period, such as a few hours or days. The order of applying the compound of component (A) and the active ingredient of component (B) is not essential for working the present invention.

Some of said compositions according to the invention have a systemic action and can be used as foliar, soil and seed treatment fungicides.

With the compositions according to the invention it is possible to inhibit or destroy the phytopathogenic microorganisms which occur in plants or in parts of plants (fruit, blossoms, leaves, stems, tubers, roots) in different useful plants, while at the same time the parts of plants which grow later are also protected from attack by phytopathogenic microorganisms.

The compositions of the present invention are of particular interest for controlling a large number of fungi in various useful plants or their seeds, especially in field crops such as potatoes, tobacco and sugarbeets, and wheat, rye, barley, oats, rice, maize, lawns, cotton, soybeans, oil seed rape, pulse crops, sunflower, coffee, sugarcane, fruit and ornamentals in horticulture and viticulture, in vegetables such as cucumbers, beans and cucurbits.

The compositions according to the invention are applied by treating the fungi, the useful plants, the locus thereof, the propagation material thereof, the natural substances of plant and/or animal origin, which have been taken from the natural life cycle, and/or their processed forms, or the industrial materials threatened by fungus attack with a combination of components (A) and (B), preferably in a synergistically effective amount.

The compositions according to the invention may be applied before or after infection of the useful plants, the propagation material thereof, the natural substances of plant and/or animal origin, which have been taken from the natural life cycle, and/or their processed forms, or the industrial materials by the fungi.

The compositions according to the invention are particularly useful for controlling the following plant diseases:
*Alternaria* species in fruit and vegetables,
*Ascochyta* species in pulse crops,
*Botrytis cinerea* in strawberries, tomatoes, sunflower, pulse crops, vegetables and grapes,
*Cercospora* species in soybean, maize, and sugarbeet
*Cercospora arachidicola* in peanuts,
*Cochliobolus sativus* in cereals,
*Colletotrichum* species in pulse crops,
*Corynespora* in soybean and vegetables,
*Erysiphe* species in cereals,
*Erysiphe cichoracearum* and *Sphaerotheca fuliginea* in cucurbits,
*Fusarium* species in fruit, vegetables, cereals and maize,
Gäumannomyces graminis in cereals and lawns,
*Helminthosporium* species in maize, rice and potatoes,
*Hemileia vastatrix* on coffee,
*Microdochium* species in wheat and rye,
*Mycosphaerella* species in fruit and vegetables,
*Phakopsora* species in soybean,
*Phoma* species in oil seed crops and coffee,
*Puccinia* species in cereals, broadleaf crops and perennial plants,
*Pseudocercosporella* species in cereals,
*Phragmidium* mucronatum in roses,
*Podosphaera* species in fruits,
*Pyrenophora* species in barley,
*Pyricularia oryzae* in rice,
*Ramularia collo-cygni* in barley,
*Rhizoctonia* species in cotton, soybean, cereals, maize, potatoes, rice and lawns,
*Rhynchosporium secalis* in barley and rye,
*Sclerotinia* species in lawns, lettuce, vegetables, soybean, and oil seed rape,
*Septoria* species in cereals, soybean and vegetables,
*Sphacelotheca reilliana* in maize,
*Tilletia* species in cereals,
*Guignardia bidwellii* and *Phomopsis viticola* in vines,
*Urocystis occulta* in rye,
*Uncinula necator* in vines,
*Ustilago* species in cereals and maize,
*Venturia* species in fruits,
*Monilia* and *Monilinia* species on fruits,
*Penicillium* species on citrus and apples.

The compositions according to the invention are preventively and/or curatively valuable active ingredients in the field of pest control, even at low rates of application.

When applied to the useful plants the component (A) is applied at a rate of 5 to 2000 g a.i./ha, particularly 10 to 1000 g a.i./ha, e.g. 25, 50, 75, 100 or 200 g a.i./ha, in association with 1 to 5000 g a.i./ha, particularly 2 to 2000 g a.i./ha, e.g. 25, 50, 75, 100, 250, 500, 800, 1000, 1500 g a.i./ha of component (B).

In agricultural practice, the application rates of the composition according to the invention depend on the type of effect desired, and typically range from 20 to 4000 g of total combination per hectare.

When the compositions of the present invention are used for treating seed, rates of 0.001 to 50 g of a compound of formula (I) or (IA) per kg of seed, preferably from 0.01 to 10 g per kg of seed, and 0.001 to 50 g of a compound of component (B), per kg of seed, preferably from 0.01 to 10 g per kg of seed, are generally sufficient.

The invention also provides fungicidal compositions comprising a combination of components (A) and (B) as mentioned above in a synergistically effective amount, together with an agriculturally acceptable carrier, and optionally a surfactant. In said compositions, the weight ratio of (A) to (B) is preferably between 1000:1 and 1:1000, more preferably as described hereinbefore.

The compositions of the invention may be employed in any conventional form, for example in the form of a twin pack, a powder for dry seed treatment (DS), an emulsion for seed treatment (ES), a flowable concentrate for seed treatment (FS), a solution for seed treatment (LS), a water dispersible powder for seed treatment (WS), a capsule suspension for seed treatment (CF), a gel for seed treatment (GF), an emulsion concentrate (EC), a suspension concentrate (SC), a suspo-emulsion (SE), a capsule suspension (CS), a water dispersible granule (WG), an emulsifiable granule (EG), an emulsion, water in oil (EO), an emulsion, oil in water (EW), a micro-emulsion (ME), an oil dispersion (OD), an oil miscible flowable (OF), an oil miscible liquid (OL), a soluble concentrate (SL), an ultra-low volume suspension (SU), an ultra-low volume liquid (UL), a technical concentrate (TK), a dispersible concentrate (DC), a wettable powder (WP) or any technically feasible formulation in combination with agriculturally acceptable adjuvants.

Such compositions may be produced in conventional manner, e.g. by mixing the active ingredients with appropriate formulation inerts (diluents, solvents, fillers and optionally other formulating ingredients such as surfactants, biocides, anti-freeze, stickers, thickeners and compounds that provide adjuvancy effects). Also conventional slow release formulations may be employed where long lasting efficacy is intended. Particularly formulations to be applied in spraying forms, such as water dispersible concentrates (e.g. EC, SC, DC, OD, SE, EW, EO and the like), wettable powders and granules, may contain surfactants such as wetting and dispersing agents and other compounds that provide adjuvancy effects, e.g. the condensation product of formaldehyde with naphthalene sulphonate, an alkylarylsulphonate, a lignin sulphonate, a fatty alkyl sulphate, and ethoxylated alkylphenol and an ethoxylated fatty alcohol.

A seed dressing formulation is applied in a manner known per se to the seeds employing the combination of the invention and a diluent in suitable seed dressing formulation form, e.g. as an aqueous suspension or in a dry powder form having good adherence to the seeds. Such seed dressing formulations are known in the art. Seed dressing formulations may contain the single active ingredients or the combination of active ingredients in encapsulated form, e.g. as slow release capsules or microcapsules.

In general, the formulations include from 0.01 to 90% by weight of active agent, from 0 to 20% agriculturally acceptable surfactant and 10 to 99.99% solid or liquid formulation inerts and adjuvant(s), the active agent consisting of at least the compound of formula I together with component (B) and (C), and optionally other active agents, particularly microbiocides or conservatives or the like. Concentrated forms of compositions generally contain in between about 2 and 80%, preferably between about 5 and 70% by weight of active agent. Application forms of formulation may for example contain from 0.01 to 20% by weight, preferably from 0.01 to 5% by weight of active agent. Whereas commercial products will preferably be formulated as concentrates, the end user will normally employ diluted formulations.

BIOLOGICAL EXAMPLES

The compositions according to the invention are tested for their biological (fungicidal) activity as dimethylsulfoxide (DMSO) solutions using one or more of the following protocols (Examples 2 to 8). A standard description of the liquid culture tests is provided in Example 1.

The compound of component (A) which is (1S)-2,2-bis (4-fluorophenyl)-1-methylethyl N-{[3-(acetyloxy)-4-methoxy-2-pyridyl]carbonyl}-L-alaninate (florylpicoxamid—CAS registry no. 1961312-55-9) and its synthesis are known from WO 2016/122802. As already indicated, component (B) of the compositions are known and are commercially available and/or can be prepared using procedures known in the art and/or procedures reported in the literature.

Example 1

Liquid Culture Tests in Well Plates

Mycelia fragments or conidia suspensions of a fungus, prepared either freshly from liquid cultures of the fungus or from cryogenic storage, are directly mixed into nutrient broth. DMSO solutions of the test compound (max. 10 mg/mL) is diluted with 0.025% Tween20 by factor 50 and 10 µL of this solution is pipetted into a microtiter plate (96-well format). The nutrient broth containing the fungal spores/mycelia fragments is then added to give an end concentration of the tested compound. The test plates are incubated in the dark at 24° C. and 96% relative humidity (rh). The inhibition of fungal growth is determined photometrically and visually after 3-7 days, depending on the pathosystem, and percent antifungal activity relative to the untreated check is calculated.

Example 2

Glomerella lagenarium (Syn. Colletotrichum lagenarium, Anthracnose of Cucurbits)

Conidia of the fungus from cryogenic storage were directly mixed into nutrient broth (PDB potato dextrose broth). After placing a DMSO solution of the test compositions into a microtiter plate (96-well format), the nutrient broth containing the fungal spores was added. The test plates were incubated at 24° C. and the inhibition of growth was determined photometrically after 72 hours at 620 nm.

Example 3

Pyricularia Oryzae (Rice Blast)

Conidia of the fungus from cryogenic storage were directly mixed into nutrient broth (PDB potato dextrose broth). After placing a DMSO solution of the test compositions into a microtiter plate (96-well format) the nutrient broth containing the fungal spores was added. The test plates were incubated at 24° C. and the inhibition of growth was determined photometrically after 72 hours.

Example 4

*Venturia Inaequalis* (Apple Scab)

Conidia of the fungus from cryogenic storage were directly mixed into nutrient broth (PDB potato dextrose broth). After placing a DMSO solution of the test compositions into a microtiter plate (96-well format) the nutrient broth containing the fungal spores was added. The test plates were incubated at 24° C. and the inhibition of growth was determined photometrically after 7 days at 620 nm.

Example 5

*Septoria Tritici* (Leaf Blotch)

Conidia of the fungus from cryogenic storage were directly mixed into nutrient broth (PDB potato dextrose broth). After placing a DMSO solution of the test compositions into a microtiter plate (96-well format) the nutrient broth containing the fungal spores was added. The test plates were incubated at 24° C. and the inhibition of growth was determined photometrically after 72 hours.

Example 6

*Mycosphaerella arachidis*, Syn. *Cercospora Arachidicola* (Peanut Brown Leaf Spot)

Conidia of the fungus from cryogenic storage were directly mixed into nutrient broth (PDB potato dextrose broth). After placing a DMSO solution of the test compositions into a microtiter plate (96-well format), the nutrient broth containing the fungal spores was added. The test plates were incubated at 24° C. and the inhibition of growth was determined photometrically after approximately 5-6 days.

Example 7

*Pyrenophora Teres*

Conidia of the fungus from cryogenic storage were directly mixed into nutrient broth (PDB potato dextrose broth). After placing a DMSO solution of the test compositions into a microtiter plate (96-well format) the nutrient broth containing the fungal spores was added. The test plates were incubated at 24° C. and the inhibition of growth was determined photometrically after 72 hours.

Example 8

*Ramularia Collo-Cygni*

Conidia of the fungus from cryogenic storage were directly mixed into nutrient broth (PDB potato dextrose broth). After placing a DMSO solution of the test compositions into a microtiter plate (96-well format) the nutrient broth containing the fungal spores was added. The test plates were incubated at 24° C. and the inhibition of growth was determined photometrically after approximately 4 days.
Results:
Results from the tests outlined above are shown below in Tables 1 to 4. These data show that synergistic fungicidal activity is observed for the combination of florylpicoxamid and another active ingredient of component (B) against *Pyricularia oryzae* and *Mycosphaerella arachidis* at certain weight ratios.

TABLE 1

Fungicidal activity of a composition of florylpicoxamid and benzovindiflupyr against *Pyricularia oryzae* as described in Example 3 above.

| florylpicoxamid (A) (ppm) | benzovindiflupyr (B) (ppm) | Ratio compound (A):(B) | florylpicoxamid (A) inhibition (%) | benzovindiflupyr (B) inhibition (%) | Expected (additive) actvity (Colby) (%) | Combined inhibition (observed) (%) |
|---|---|---|---|---|---|---|
| 0.0031 | | | 0 | | | |
| 0.0063 | | | 0 | | | |
| 0.0125 | | | 0 | | | |
| 0.0250 | | | 0 | | | |
| 0.0500 | | | 0 | | | |
| 0.1000 | | | 20 | | | |
| | 0.0125 | | | 20 | | |
| | 0.0250 | | | 50 | | |
| | 0.0500 | | | 70 | | |
| | 0.1000 | | | 90 | | |
| 0.0031 | 0.0125 | 1:4 | | | 20 | 50 |
| 0.0063 | 0.0250 | 1:4 | | | 50 | 70 |
| 0.0125 | 0.0250 | 1:2 | | | 50 | 70 |
| 0.0125 | 0.0500 | 1:4 | | | 70 | 90 |
| 0.0250 | 0.0500 | 1:2 | | | 70 | 90 |
| 0.0250 | 0.1000 | 1:4 | | | 90 | 100 |
| 0.0500 | 0.0250 | 2:1 | | | 50 | 70 |
| 0.0500 | 0.1000 | 1:2 | | | 90 | 100 |
| 0.1000 | 0.0250 | 4:1 | | | 60 | 90 |
| 0.1000 | 0.0500 | 2:1 | | | 76 | 90 |

TABLE 2

Fungicidal activity of a composition of florylpicoxamid and azoxystrobin against *Pyricularia oryzae* as described in Example 3 above.

| florylpicoxamid (A) (ppm) | azoxystrobin (B) (ppm) | Ratio compound (A):(B) | florylpicoxamid (A) inhibition (%) | azoxystrobin (B) inhibition (%) | Expected (additive) actvity (Colby) (%) | Combined inhibition (observed) (%) |
|---|---|---|---|---|---|---|
| 0.1000 | | | 20 | | | |
| 0.2000 | | | 50 | | | |
| | 0.0250 | | | 0 | | |
| | 0.0500 | | | 0 | | |
| | 0.1000 | | | 0 | | |
| | 0.2000 | | | 0 | | |
| 0.1000 | 0.0250 | 4:1 | | | 20 | 50 |
| 0.1000 | 0.0500 | 2:1 | | | 20 | 50 |
| 0.1000 | 0.1000 | 1:1 | | | 20 | 50 |
| 0.1000 | 0.2000 | 1:2 | | | 20 | 90 |

TABLE 2-continued

Fungicidal activity of a composition of florylpicoxamid and azoxystrobin against *Pyricularia oryzae* as described in Example 3 above.

| florylpicoxamid (A) (ppm) | azoxystrobin (B) (ppm) | Ratio compound (A):(B) | florylpicoxamid (A) inhibition (%) | azoxystrobin (B) inhibition (%) | Expected (additive) actvity (Colby) (%) | Combined inhibition (observed) (%) |
|---|---|---|---|---|---|---|
| 0.2000 | 0.0500 | 4:1 | | | 50 | 70 |
| 0.2000 | 0.1000 | 2:1 | | | 50 | 70 |
| 0.2000 | 0.2000 | 1:1 | | | 50 | 70 |

TABLE 3

Fungicidal activity of a composition of florylpicoxamid and chlorothaolnil against *Pyricularia oryzae* as described in Example 3 above.

| florylpicoxamid (A) (ppm) | chlorothalonil (B) (ppm) | Ratio compound (A):(B) | florylpicoxamid (A) inhibition (%) | chlorothalonil (B) inhibition (%) | Expected (additive) actvity (Colby) (%) | Combined inhibition (observed) (%) |
|---|---|---|---|---|---|---|
| 0.0250 | | | 0 | | | |
| 0.0500 | | | 20 | | | |
| 0.1000 | | | 30 | | | |
| 0.2000 | | | 60 | | | |
| | 0.2500 | | | 0 | | |
| | 0.5000 | | | 0 | | |
| | 1.0000 | | | 20 | | |
| 0.0250 | 1.0000 | 1:4 | | | 20 | 50 |
| 0.0500 | 0.2500 | 2:1 | | | 20 | 50 |
| 0.0500 | 1.0000 | 1:2 | | | 36 | 100 |
| 0.1000 | 0.2500 | 4:1 | | | 30 | 60 |
| 0.1000 | 0.5000 | 2:1 | | | 30 | 70 |
| 0.1000 | 1.0000 | 1:1 | | | 44 | 100 |
| 0.2000 | 0.5000 | 4:1 | | | 60 | 90 |
| 0.2000 | 1.0000 | 2:1 | | | 68 | 100 |

TABLE 4

Fungicidal activity of a composition of florylpicoxamid and pydiflumetofen against *Mycosphaerella arachidis* as described in Example 6 above.

| florylpicoxamid (A) (ppm) | pydiflumetofen (B) (ppm) | Ratio compound (A):(B) | florylpicoxamid (A) inhibition (%) | pydiflumetofen (B) inhibition (%) | Expected (additive) actvity (Colby) (%) | Combined inhibition (observed) (%) |
|---|---|---|---|---|---|---|
| 0.0250 | | | 4 | | | |
| 0.0500 | | | 15 | | | |
| 0.1000 | | | 38 | | | |
| | 0.0025 | | | 1 | | |
| | 0.0050 | | | 0 | | |
| | 0.0100 | | | 28 | | |
| | 0.0200 | | | 70 | | |
| 0.0250 | 0.0050 | 1:2 | | | 4 | 63 |
| 0.0250 | 0.0100 | 1:4 | | | 31 | 98 |
| 0.0500 | 0.0050 | 1:1 | | | 15 | 58 |
| 0.0500 | 0.0100 | 1:2 | | | 39 | 95 |
| 0.0500 | 0.0200 | 1:4 | | | 74 | 100 |
| 0.1000 | 0.0025 | 4:1 | | | 38 | 85 |
| 0.1000 | 0.0050 | 2:1 | | | 38 | 75 |
| 0.1000 | 0.0100 | 1:1 | | | 55 | 95 |
| 0.1000 | 0.0200 | 1:2 | | | 81 | 99 |

What is claimed is:

1. A fungicidal composition comprising a mixture of components (A) and (B) as active ingredients, wherein component (A) is the compound of formula (I):

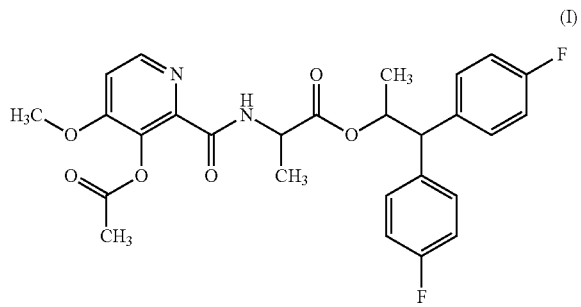 [SMILES: COc1ccnc(C(=O)NC(C)C(=O)OC(C)C(c2ccc(F)cc2)c2ccc(F)cc2)c1OC(C)=O]

or an agrochemically acceptable salt, N-oxide, diastereoisomer, enantiomer or tautomer thereof;

and component (B) is pydiflumetofen, wherein the weight ratio of (A) to (B) is from 10:1 to 1:10, and wherein components (A) and (B) are present in a synergistically effective weight ratio.

2. The composition according to claim 1, wherein component (A) is the compound of Formula (IA):

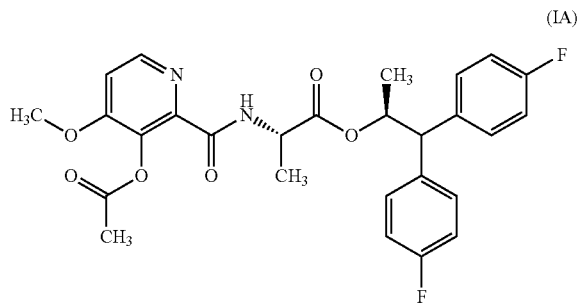 [SMILES: COc1ccnc(C(=O)N[C@@H](C)C(=O)O[C@@H](C)C(c2ccc(F)cc2)c2ccc(F)cc2)c1OC(C)=O]

or an agrochemically acceptable salt, N-oxide or tautomer thereof.

3. The composition according to claim 1, wherein the weight ratio of (A) to (B) is from 5:1 to 1:5.

4. The composition according to claim 1, further comprising an agriculturally acceptable carrier and/or formulation adjuvant, and optionally, a surfactant.

5. A fungicidal composition according to claim 1, wherein the composition comprises an additional active ingredient component (C), which is different to component (B), selected from the group consisting of:

benzovindiflupyr, isopyrazam, azoxystrobin, difenoconazole, prothioconazole, chlorothalonil, fenpropidin, acibenzolar-S-methyl, cyproconazole, cyprodinil, fenpropimorph, propiconazole, hexaconazole, penconazole, pyrifenox, fludioxonil, pyroquilon, tricyclazole, fluazinam, mandipropamid, metalaxyl, metalaxyl-M, oxadixyl, oxathiapiprolin, paclobutrazol, sulfur, thiabendazole, *Aspergillus Flavus* NRRL 21882 and *Bacillus subtilis* var. *amyloliquefaciens* Strain FZB24.

6. A method of controlling diseases on useful plants or on propagation material thereof caused by phytopathogens, which comprises applying to the useful plants, the locus thereof or propagation material thereof, a composition as defined in claim 1.

7. The method according to claim 6, wherein the phytophathogen is from a genus selected from the group consisting of *Septoria*, *Mycosphaerella*, *Pyricularia*, *Pyrenophora*, *Colletotrichum*, *Uncinula*, *Venturia*, *Ramularia*, *Erysiphe*, *Puccinia* and *Phakopsora*.

8. The method according to claim 6, wherein the phytophathogen is selected from the group consisting of *Septoria tritici*, *Septoria glycines*, *Septoria nodorum*, *Mycosphaerella arachidis*, *Mycosphaerella fijiensis*, *Pyricularia oryzae*, *Pyrenophora teres*, *Colletotrichum lagenarium*, *Venturia inaequalis* and *Ramularia collo-cygni*.

9. The method according to claim 6, wherein the useful plant is selected from the group consisting of cereals, legumes, vegetables, fruits, and nuts.

10. The method according to claim 6, wherein the useful plant is selected from the group consisting of wheat, barley, rice, soybean, apples, grapes, cucumber, peanuts, and bananas.

11. The method according to claim 6, wherein the components (A) and (B) are applied in a sequential manner.

12. A method of protecting natural substances of plant and/or animal origin, which have been taken from the natural life cycle, and/or their processed forms, which comprises applying to said natural substances of plant and/or animal origin or their processed forms a combination of components (A) and (B) as defined in claim 1.

13. The method according to claim 6, wherein the phytophathogen is selected from the group consisting of *Pyricularia oryzae* or *Mycosphaerella arachidis*.

14. A fungicidal composition comprising a mixture of components (A) and (B) as active ingredients, wherein component (A) is the compound of formula (I):

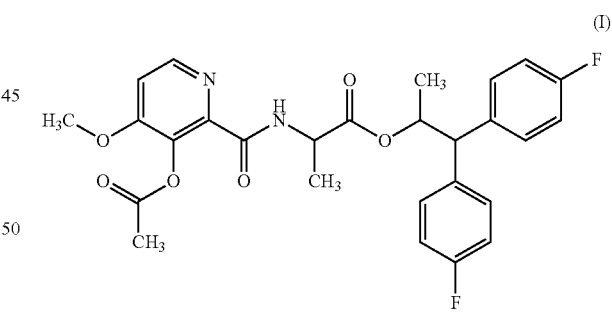

or an agrochemically acceptable salt, N-oxide, diastereoisomer, enantiomer or tautomer thereof;

and component (B) is pydiflumetofen, wherein the weight ratio of (A) to (B) is from 4:1 to 1:4.

* * * * *